May 26, 1942.  E. S. HINELINE  2,284,487
PHOTOGRAPHIC FILM MAGAZINE AND FEEDING MEANS, PARTICULARLY
FOR PHOTORECORDING CAMERAS
Original Filed April 10, 1940  4 Sheets-Sheet 1
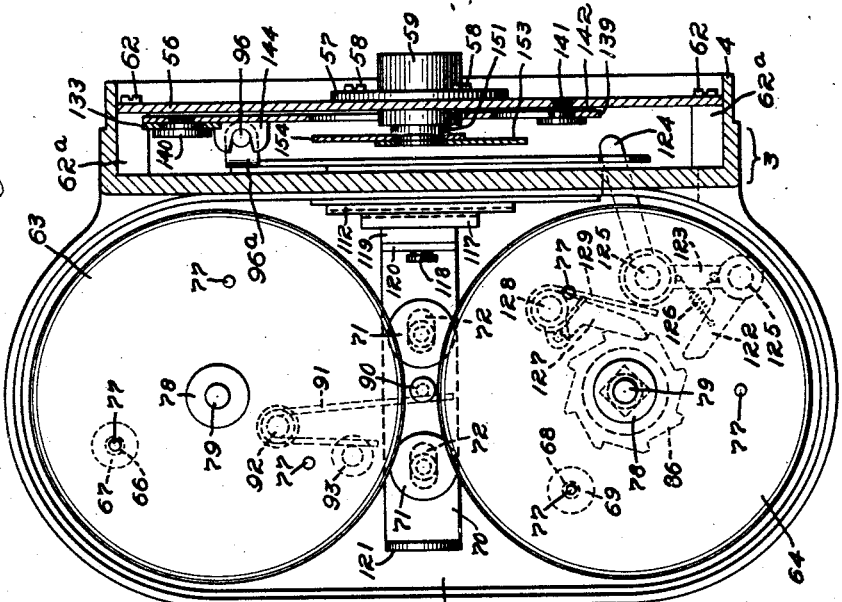
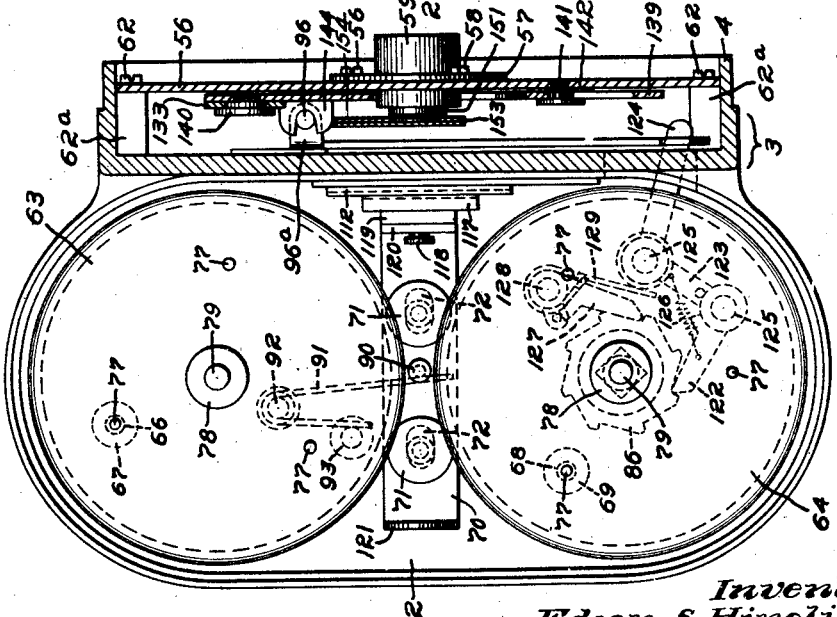
Inventor:
Edson S. Hineline,
by Emery, Booth, Townsend, Miller and Widdess
Attys.

Inventor:
Edson S. Hineline,
Attys.

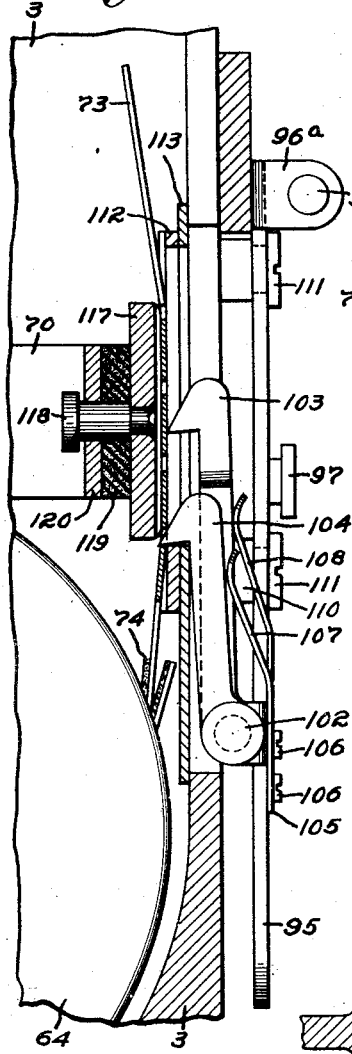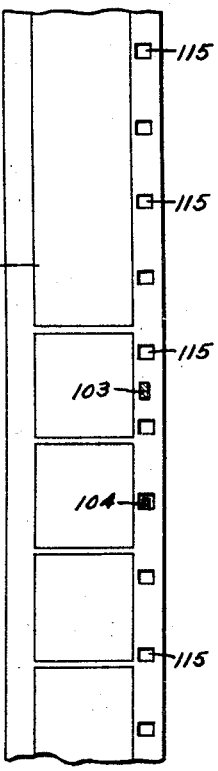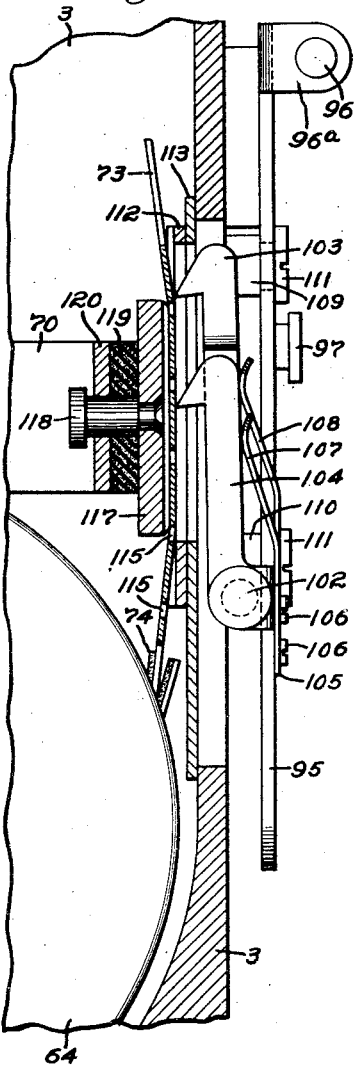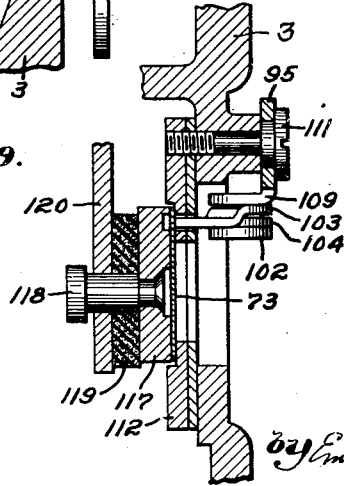

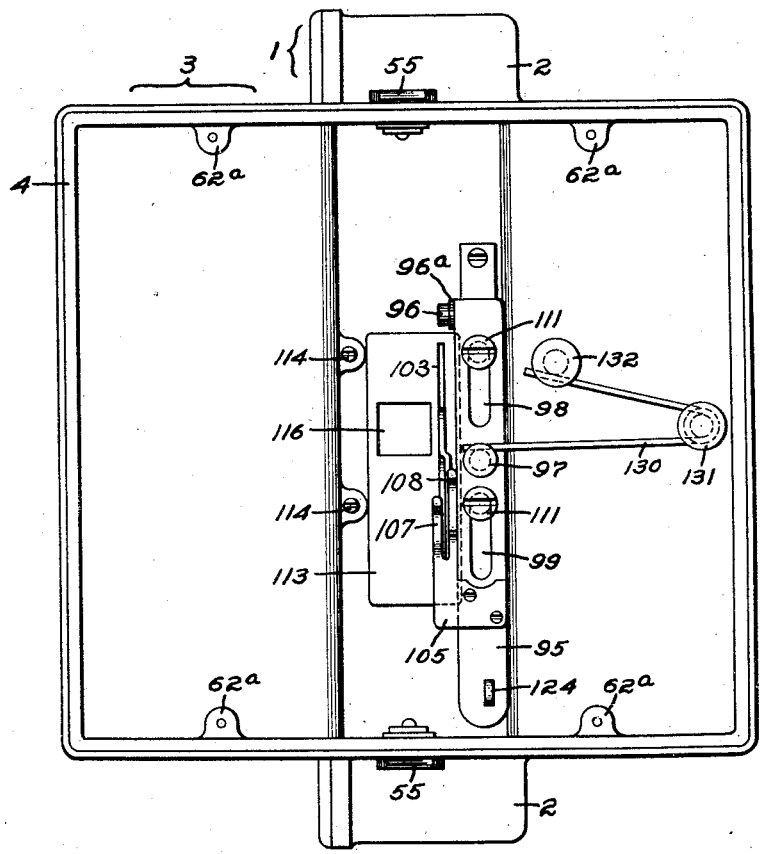

Patented May 26, 1942

2,284,487

UNITED STATES PATENT OFFICE 2,284,487

PHOTOGRAPHIC FILM MAGAZINE AND FEEDING MEANS, PARTICULARLY FOR PHOTORECORDING CAMERAS

Edson S. Hineline, Rochester, N. Y., assignor to The Folmer Graflex Corporation, Rochester, N. Y., a corporation of Delaware Original application April 10, 1940, Serial No. 328,868. Divided and this application May 8, 1941, Serial No. 392,464

17 Claims. (Cl. 95—34)

This application is a division of my co-pending application Ser. No. 328,868, filed April 10, 1940.

This invention relates to photographic film magazines and to feeding means for said film, being particularly applicable for but not limited to photorecording cameras.

In order that the principle of the invention may be readily understood, I have disclosed a single embodiment thereof in the accompanying drawings showing one application or use of my invention, and wherein Fig. 1 is a partial longitudinal section through the camera, showing the take-off and take-up magazines in place, the take-up mechanism being shown in dotted lines, and the shutter release lever being shown as moved all the way down, the hood-like part being omitted;

Fig. 2 is a view similar to Fig. 1, but showing the shutter release lever as having been released, thus advancing film, the camera being at rest;

Fig. 6 is a detail in part section upon a larger scale, of the shutter advancing means, the film being shown as having been pulled all the way down;

Fig. 7 is a detail in plan of the film strip, showing the relative size of the exposure area in relation to the film perforations;

Fig. 8 is a view similar to Fig. 6, but wherein the film advancing means has been caused to travel all the way to the top so as to engage the film strip on the next downward movement;

Fig. 9 is a partial vertical section through the camera, showing the film guide plate and the pressure pad, the film strip being in place; and Fig. 10 is a front elevation of the camera having the shutter plate removed, and showing the film advancing bar and the exposure aperture.

Figure 3:
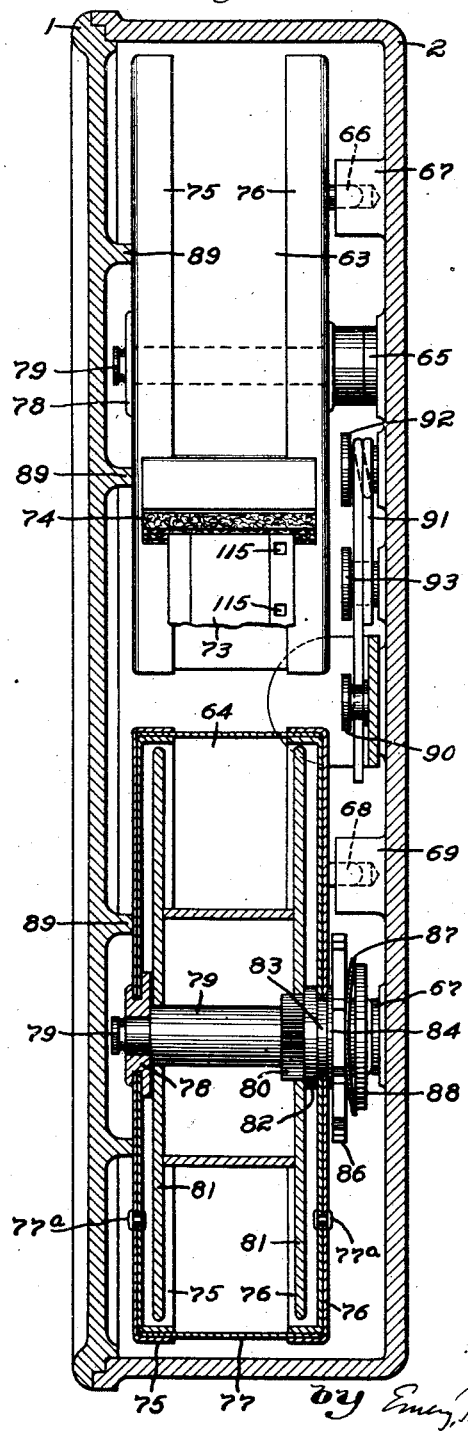
Fig. 3 is a transverse section through the magazine housing, showing the position of the take-off magazine and the take-up magazine, the latter being shown in section.

This invention, while not limited thereto, will be described with partial reference to cameras for photo-recording different objects, such as electric meters, gas meters, labels or packages, and any other object having dimensions that correspond with or may be received within the opening or rim of the camera nose or of the hood-like part (not shown) that surrounds the lens case thereof and carries the illumination means and certain other parts.

In Patent No. 1,963,095 issued June 19, 1934, and in Patent No. 2,034,441 issued March 17, 1936, to myself and William H. Petit as joint inventors, there is disclosed an automatic film camera or so-called Factograph camera which is motor driven and is particularly constructed for making successive exposures with great rapidity one after another of objects closely positioned with respect to each other, as, for example, the readings of meters in telephone exchanges. The camera shown in said patents is particularly adapted to be operated by an external electrical current to which the camera might readily be plugged, in a manner fully described in said patents, the camera containing a motor electrically driven from said externally derived current, by which motor the film was fed and the shutter was operated.

An important object of the invention is to provide improved means for advancing the film automatically after each exposure is made. Another object is to provide such type of camera with a film container readily insertable into and readily removable from the camera so that daylight loading can readily be accomplished, or from which film container any amount of film can be removed while the container is in the camera and without disturbing the film supply. Another object is to provide means adaptable for conjointly operating the film feed means or bar and the shutter operating means.

The entire camera casing is not herein shown. It may, as more fully disclosed in my said parent application Ser. No. 328,868 be a camera casing which is, in part, of an approximately elliptical disk-like form with a large rectangular hood-like part protruding from an edge thereof, but not herein shown, said protruding hood-like part being received upon a rectangular rim projecting from and integral with one member of the magazine-receiving part of the casing, and to which rim the said hood-like part is connected. The said elliptical portion of the structure is of sufficient thickness between the walls of the two parts thereof, to receive the magazine containing the unexposed film and the magazine to receive the exposed portion of the film therefrom, sufficient space being afforded in advance of said two magazines within said rim to receive the film-operating means and the shutter and its operating means. For that purpose the housing of the magazine portion of the camera is composed of a flat member 1, best shown in Fig. 3, constituting the magazine door or cover, and a mating receptacle-part 2 receiving both the magazines and from an edge of which part 2 integrally projects a mechanism-housing part 3 having an outer rectangular rim 4 to which the hood-like part is adapted to be attached.

To operate the parts, I provide, but do not herein show, a shutter-operating and film-feeding lever provided with an operating knob. Said lever operates all the functioning parts, and for that purpose it may be connected to a shaft having fast thereon a second lever within the said hood-like part of the housing, and which operates a pin connected to the shutter-operating means.

Referring to Figs. 1 to 3, wherein is shown the means for supporting the take-off magazine and the take-up magazine for the film, which is preferably, though not necessarily, a standard perforated film without a leading or a trailer end. My invention is not, however, limited to the use of such film.

The camera is provided with a shutter plate 56 which is secured fixedly in position within and to the mechanism housing part 3 of the camera casing, as indicated in Figs. 1 and 2. The said shutter plate 56 has attached thereto the lens flange 57 by means of screw 58, 58. Into the lens flange 57 is screwed or otherwise secured a lens 59. The said shutter plate 56 is provided with a narrow vertical slot (not herein shown, since said shutter plate is omitted from Fig. 10) to permit the vertical operating movement of the operating pin, desirably operated by movement of the hand-actuated lever above referred to but not shown. The said shutter plate 56 is also provided with a suitable number of holes to receive screws 62 for attaching the said shutter plate 56 within the mechanism-housing part 3 of the framing or housing.

It has been stated that the magazine-receiving portion of the camera is of the general shape of an elliptical disk of sufficient thickness to receive the film take-off and take-up magazine. This shape and construction best appear from Figs. 1 and 2, from which it will be observed that forward of the two magazines and integral with the part 2 thereof is the part of the camera casing which I term the mechanism-housing and which is indicated at 3 in Figs. 1 and 2. Within the same is supported the film-operating means and protruding through the front thereof is the lens 59 already referred to. From the said Figs. 1 and 2 the hood-like part of the structure has been omitted or removed.

The said shutter plate 56 is attached to the magazine-housing 3 by means of screws 62, 62 passing through holes, which screws are threaded into the bosses 62a, 62a. The relative positions of the take-off or feed magazine and the take-up magazine are clearly evident from Figs. 1 and 2. The take-off or feed magazine is indicated at 63 and the take-up magazine at 64. The receptacle part 2 of the said magazine structure 1, 2 is provided with the pin 65, best shown in Fig. 3 and on which is mounted the feed magazine 63, which is provided with a dowel 66 engaging a boss 67, shown best in dotted lines in Figs. 1 and 2. The said take-up magazine 64 is mounted on the pin 67a which is attached to the receptacle part 2. The said take-up magazine 64 is held in position by means of a dowel 68 engaging a boss 69, shown in dotted lines in Figs. 1 and 2 and in full lines in Fig. 3. Attached to the receptacle part 2 and located between the said magazines 63 and 64 is a presser plate bar 70, best shown in Figs. 1 and 2 and also shown in part upon a larger scale in Figs. 6 and 8. The said presser plate bar 70 is secured to the said receptacle part 2 by means of shoulder screws 71, 71. The said bar 70 is provided with slots 72, 72.

Referring again to Fig. 3, the take-off magazine and the take-up magazine 63, 64 are shown as supported upon the pins, bosses and dowels already referred to, and the sensitized film (a portion of which is shown separately in Fig. 7 at 73) is represented in Fig. 3 as being fed through a suitable light trap 74 of the magazine 64. Both of the said magazines 63 and 64 are represented in Fig. 3 as each made up of two sets of concentric cups 75, 75 and 76, 76, between which is received the cylindrical wall or body 77. The said cup-shaped members receive the edges of the wall member 77 between them and the members of the respective pairs of cups are held together by rivets 77a, 77a and bearing bushings 78, 78.

Each of said magazines is also provided with a film-spool carrier 79 having a squared base 80 to engage a squared opening in the standard film spool 81 that receives the film 73. Each film-spool carrier 79 is provided with a collar 82, shown in Fig. 5, which is integral with the carrier 79. The said collar 82 also serves to align the film spool 81 correctly with relation to the other parts. Said collar also serves to prevent the film spool carrier 79 from passing through a hole in the magazine collar consisting in the present instance of the cup-shaped members 75, 76. The said film-spool carrier 79 has a reduced diameter 83, shown in Fig. 3, for passing through a hole in the magazine cover. A washer 84 is also fitted over the said reduced diameter 83 and provides means for holding the film carrier 79 to the magazine cover. The said film carrying member 79 has a further reduced diameter 85, over which rides a film take-up ratchet plate 86, shown in section in Fig. 5, and a ratchet tension spring 87. The said ratchet and spring are held in place by a thrust washer 88 staked to the film carrier 79, all as clearly shown in Fig. 5. The film carrier 79 in the take-off magazine 63 is not provided with means for a take-up action, but is merely turned upon its stud 65.

The said magazines 63 and 64 are held in place on their studs 65 and 67 by means of projections 89 integral with the member 1 of the magazine-receiving portion of the housing.

As most clearly shown in Figs. 1, 2 and 3, the said presser plate bar 70 is tensioned by means of a shoulder stud 90 thereon which is engaged by a spring 91 coiled about a shoulder stud 92 and held under tension by means of a second shoulder stud 93.

I will next refer to the means for feeding the film and which is desirably but not necessarily so associated in operation with the operation of the shutter and the furnishing of illumination that all parts of the camera function in unison and are intimately related in operation. For that purpose, I will first refer to Figs. 4, 6, 8 and 9. Therein, a film-feed bar is indicated generally at 95, it having an operating stud 96 extending from a turned-down lip 96a. The said bar 95 is also provided with a spring stud 97 riveted thereto and with two lengthwise extending slots 98, 99, an upturned boss 100, and a smaller slot 101 which receives a film take-up ratchet-pawl to be referred to, and which is shown in Figs. 1 and 2. Mounted upon the said boss 100 by means of shoulder rivet 102 are film-feed dogs 103 and 104. Also attached to the said film-feed bar 95 is a spring plate 105, being attached to bar 95 by means of rivets 106, 106 having longitudinally extending spring fingers 107, 108, the structure of which is best shown in Figs. 6 and 8. The spring finger 107 tends to cause the film-feed dog 104 to move in such a direction as to engage feeding openings in the film strip 73, and the spring finger 108 tends to cause the film dog 103 to move in engagement with notches in said strip.

The said film-feed bar 95 is mounted in the said mechanism-housing part 3 on studs 109, 110 (not shown) by means of shoulder screws 111, 111, best shown in Figs. 6, 8, 9 and 10. The said shoulder screws 111, 111, also hold a film-guide plate 112 and an aperture plate 113 in position upon the mechanism-housing part 3. The said guide plate and aperture plate are also held in place by means of screws 114, 114, best shown in Fig. 10.

Inasmuch as the film-feed bar 95 is provided with the lengthwise slots 98, 99 and rides on the shoulder screws 111, 111, it is free to receive a lengthwise movement within the limits of the said slots 98, 99. This movement is a vertical one, viewing Figs. 4 and 10, where the relative position of the said bar 95 with respect to aperture plate 113 best appears.

Figure 4:
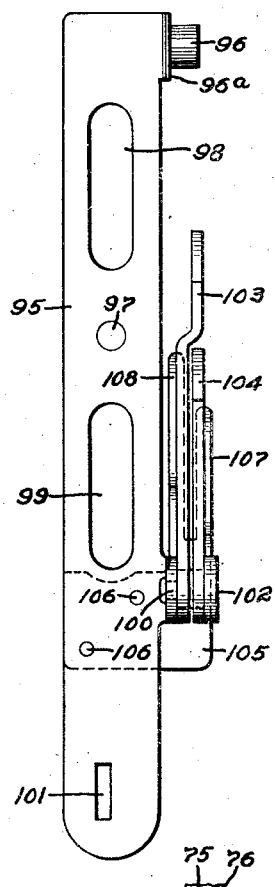
Fig. 4 is a plan view of the film-feed bar.

As the bar 95 moves lengthwise, or upward viewing Figs. 4, 6 and 8, it carries with it the film advancing dogs 103, 104 to the position shown in Fig. 8, and as said bar 95 is moved downward viewing Figs. 4, 6 and 8, the dog 103 will engage one of the film-strip perforations 115, best shown in Fig. 7. Inasmuch as the said slots 98, 99 in the feed bar 95 are of sufficient length to allow the film-feed dog 103 to travel to an extent slightly greater than 1½ spaces of perforations 115, 115, the said film strip 73 will be moved 1½ spaces, thus providing a frame equal to 1½ spaces of film perforations 115, 115.

On the next cycle of movement of the bar 95, the film-feed dog 104 will engage one of the film perforations 115 and on the downward movement of the bar 95, viewing Figs. 4 and 10, the film 73 will be caused to move a distance equal to 1½ times the spacing of film perforations 115, 115.

I have by the foregoing construction provided means whereby I may use a standard perforated film such as indicated at 73, and yet may obtain a spacing which will yield or provide for a picture 1½ times greater than if the standard spacing or feeding were used.

Referring further to Fig. 6, as the film-feed bar 95 is moved upward, the dog 104 will be moved out of engagement with a perforation 115 on the film 73 against the pressure of the spring finger 107 and will slide along the face of the film strip 73. The dog 104 will pass a perforation 115 and the dog 103 will pass two perforations until it reaches the position shown in Fig. 8. The purpose of this slight over-travel is to provide means for always engaging one of the perforations 115 of the film without it being necessary to have a very close adjustment with respect to the movement of the film-feed bar 95. As the said bar is moved downward viewing Figs. 4, 6 and 8, the film-advancing dog 103 will be pushed forward under the influence of the spring finger 108, and when the said dog 103 reaches a perforation 115, it will drop into that perforation and will cause the film 73 to move downward viewing Fig. 7, as already described. As this action takes place, the said film 73 is pulled from the take-off magazine 63 past the aperture opening 116 (Fig. 10) and is fed into the take-up magazine 64. In order to maintain the proper position of the film strip 73, the said film guide plate 112 is provided, the film passing through said guide plate on its downward movement, viewing Figs. 6, 7 and 8.

In order to hold the film 73 in accurate alignment with the film-guide plate 112, there is provided, as best shown in Figs. 6 and 8, a presser shoe or plate 117 secured to the film presser-plate bar 70 by a shoulder rivet 118. Between the said presser shoe 117 and the presser bar 70 is positioned a resilient member 119 of rubber or suitable composition. Thus the said shoe 117 is allowed in effect to "float" and to seek a proper level or position against the film 73, thereby holding said film in perfect contact with the film-guide plate 112. The said presser-plate bar 70 is provided with an upturned end 120 to which the presser shoe 117 is, as already stated, attached by means of said shoulder rivet 118. The opposite end of the film presser-plate bar 70 is provided with a second upturned end 121, shown in Figs. 1 and 2, so that the operator may move the film presser-plate bar 70 and the film presser-shoe or plate 117 away from the film guide for purposes of loading. The film presser-plate bar 70 is then returned to its proper position by spring 91, shown in Figs. 1 and 2, as already stated. Inasmuch as the film 73 is fed downward, viewing Figs. 6, 7 and 8, by the dogs 103, 104, shown in Figs. 6 and 8, and is fed into the take-up magazine 64 through the light trap 74, the said film 73 will be taken up on the film spool 81 which is caused to turn to a slight extent for each cycle of movement of the film-feed bar 95.

Figure 5:
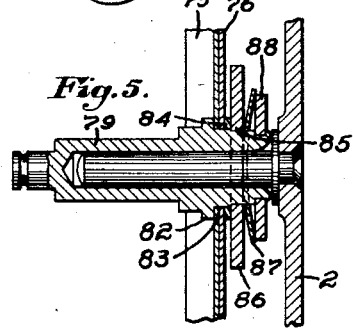
Fig. 5 is a sectional detail of the take-up spool friction drive.

Referring again to Figs. 1 and 2, it will be noted that the ratchet plate 86, shown also in Fig. 5, is engaged by a pawl 122 attached to a bell crank lever 123 having an arm 124 pivoted on a shoulder rivet 125. The said pawl 122 is caused to move in a clockwise direction under the influence of a coiled spring 126. A second or holding pawl 127 is mounted on a shoulder rivet 128 and is caused to turn in a clockwise direction under the influence of a spring 129. This structure prevents the ratchet plate 86 from turning in a contraclockwise direction.

The said lever arm 124 extends through the slot 101 of the film-feed bar 95 as already indicated. The said arm 124 is caused to move with the upward movement of the film-feed bar 95 viewing Fig. 4, sufficiently far to engage the radial edge of a tooth of the ratchet plate 86. Thus, for each cycle of movement of the film-feed dogs 103 and 104, the said ratchet plate 86 is advanced one tooth.

Inasmuch as the take-up film spool 81 will build up or increase in diameter as more film is wound thereon, means must be provided to compensate for the difference between the length of film that would be wound up and the amount of film that is actually fed by the film dogs 103, 104. To compensate for this situation, the ratchet plate 86 is mounted on the take-up member 83, best shown in Fig. 3, under the said spring tension 87, thus allowing the said ratchet plate 86 to slip when the tension on the spool 81 reaches a certain definite point. Thus, while the ratchet plate 86 will always travel a distance of one tooth, the film spool will turn only far enough actually to take up the film that has been fed to it, thus providing a very simple take-up means.

The said film-feed bar 95 is caused to be moved in an upward direction, viewing Figs. 4, 6, 8 and 10, by the operator when he manually manipulates the shutter release and film-feeding lever provided for that purpose, and hereinafter referred to, by means which will be sufficiently further referred to for the purposes of this application, and the said film-feed bar 95 is caused to move in a downward direction viewing Figs. 4, 6, 8 and 10 by a spring 130, best shown in Fig. 10 as passing around a shoulder rivet 131 and as held under tension by a shoulder rivet 132 engaging the end portion of the said spring.

I will only briefly refer to the shutter mechanism. For operating the same there is provided a lever arm 133, shown in section in Figs. 1 and 2, which is attached to the shutter plate 56 by a shoulder rivet (not shown). Said lever 133 is, through means not necessary herein fully to refer to, operated by the shutter release and film-feeding lever previously referred to as provided for manipulation by the operator, and any motion of said shutter release and film-feeding lever is transmitted to said lever arm 133. Preferably said lever arm 133 has directly connected thereto a sliding plate to which is attached the operating pin previously referred to as extending through a narrow vertical slot in the shutter plate 56.

To the said arm 133 is attached a pivoted lever-member 139 by means of a shoulder rivet 140. The lever member 139 is guided on the shutter plate 56 by means of a shoulder rivet 141 and is suitably spaced therefrom by a spacing washer 142.

The said lever member 139 is provided with an upturned lip or prong 144 near the extreme left hand end thereof, as shown in Figs. 1 and 2. The said prong 144 engages the pin 96 of the film-feed bar 95, shown in Fig. 4, and also indicated in Figs. 1 and 2. Thus, any movement imparted by the pin hereinbefore referred to by movement of the shutter-operating and film-feeding lever referred to is transmitted to the feed-operating bar 95 and causes film to be fed.

The said shutter plate 56 is provided with a boss 151, most clearly shown in Figs. 1 and 2. Riding upon a shoulder screw threaded on the said boss 151 are shutter leaves or blades 153, 154.

To operate the camera the film magazine 63 (best shown in Fig. 3) is placed in the camera and the film is threaded through film gate 112 and then led into the take-up magazine 64. The cover member 1 is replaced on the receptacle part 2 (it having been removed from the introduction of the film and the threading up thereof), and the shutter-operating and film-feeding lever is worked back and forth by the operator about four or five times, so that an unexposed area of film strip is certainly before the exposure aperture.

It is now merely necessary for the operator to hold the camera in such a position that the hood-like part if used (or, if not, the edge of the rim 4) encircles the object to be photographed, such as a meter, a bank of meters, a register or the like. Then the shutter-operating and film-feeding lever is moved by the operator by its knob until the second shutter click is heard and thereupon the operator releases his hold upon the said shutter-operating and film-feeding lever, which is automatically returned to its starting position in a manner previously described, and this return movement at the same time advances a new picture area on the film 73.

The camera is relatively light in weight and is not equipped with a motor for operating the shutter, as shown in the said Patent No. 1,963,095, issued to myself and William H. Petit. Moreover, standard film is preferably used in the camera, and the camera can be very quickly loaded and unloaded in daylight.

Having thus described one illustrative embodiment of the invention, it is to be understood that although specific terms are employed, they are used in a generic and descriptive sense and not for purposes of limitation, the scope of the invention being set forth in the following claims.

I claim:

1. In and constituting members of a complete photo-recording camera, readily carried and manually manipulated by the operator for photographing records and the like, about which the protruding rim of the camera casing encircling the lens and shutter may be placed to make the exposure, and which complete camera includes a flat camera casing body of approximately elliptical disk-like form to receive flatwise the cylindrical take-off magazine, and the cylindrical take-up magazine for the film, and a casing cover overlying said magazine; a mechanism housing constituting an integral part of the said casing body and itself having a bottom wall from which the said encircling rim projects so as to provide a free edge to be placed about the object to be photographed, a plate secured with said rim in parallelism with said bottom wall and spaced therefrom, and which plate is adapted to carry a lens and shutter, and manually-operable film-supporting and manipulating means including film feeding means between the said bottom wall and said plate, and also including a film feeding member movable to and fro within said mechanism-housing, and adapted to receive means accessible to the operator and connected with said film-feeding member for operating the latter, film-winding means for winding exposed film within said film take-up magazine roll, and operating connections between said film-feeding member and said film-winding means.

2. A combination according to claim 1, but in which said film-manipulating means includes a film feed bar mounted within said mechanism-housing for to and fro movement, and operating connections from said bar to wind exposed film in said take-up magazine.

3. In and constituting members of a complete photo-recording camera, readily carried and manually manipulated by the operator for photographing records and the like, about which the protruding rim of the camera casing encircling the lens and shutter, may be placed to make the exposure, and which complete camera includes a flat camera casing body of approximately elliptical disk-like form to receive flatwise the cylindrical take-off magazine, and the cylindrical take-up magazine for the film, and a casing cover overlying said magazines; a mechanism housing constituting an integral part of the said casing body and itself having a bottom wall from which the said encircling rim projects so as to provide a free edge to be placed about the object to be photographed, a plate secured with said rim in parallelism with said bottom wall and spaced therefrom, and which plate is adapted to carry a lens and shutter, and manually-operable film-supporting and manipulating means including film feeding means between the said bottom wall and said plate, and also including a film-feed bar mounted within said mechanism-housing for to and fro movement, pawl means carried by said feed bar and positioned to engage perforations in the film to feed the same, said film-feed bar being adapted to be connected to means under the control of the operator for imparting film-feeding movement to said feed bar.

4. In and constituting members of a complete photo-recording camera, readily carried and manually manipulated by the operator for photographing records and the like, about which the protruding rim of the camera casing encircling the lens and shutter, may be placed to make the exposure, and which complete camera includes a flat camera casing body of approximately elliptical disk-like form to receive flatwise the cylindrical take-off magazine, and the cylindrical take-up magazine for the film, and a casing cover overlying said magazines; a mechanism housing constituting an integral part of the said casing body and itself having a bottom wall from which the said encircling rim projects so as to provide a free edge to be placed about the object to be photographed, a plate secured with said rim in parallelism with said bottom wall and spaced therefrom, and which plate is adapted to carry a lens and shutter, and manually-operable film-supporting and manipulating means including film feeding means between the said bottom wall and said plate, and also including a film-feed bar mounted within said mechanism-housing for to and fro movement, pawl means carried by said feed bar and positioned to engage perforations in the film to feed the same, said film-feed bar being adapted to be connected to means under the control of the operator for imparting film-feeding movement to said feed bar, said film take-off and film take-up magazines being constructed and arranged to receive standard perforated film, and said pawl means being operable to feed said film at each feeding movement for a distance in excess of a single spacing of perforations, thereby producing an accordingly larger "frame."

5. In and constituting members of a complete photo-recording camera, readily carried and manually manipulated by the operator for photographing records and the like, about which the protruding rim of the camera casing encircling the lens and shutter, may be placed to make the exposure, and which complete camera includes a flat camera casing body of approximately elliptical disk-like form to receive flatwise the cylindrical take-off magazine, and the cylindrical take-up magazine for the film, and a casing cover overlying said magazines; a mechanism housing constituting an integral part of the said casing body and itself having a bottom wall from which the said encircling rim projects so as to provide a free edge to be placed about the object to be photographed, a plate secured with said rim in parallelism with said bottom wall and spaced therefrom, and which plate is adapted to carry a lens and shutter, and manually-operable film-supporting and manipulating means including film feeding means between the said bottom wall and said plate, and also including a film-feed bar mounted within said mechanism-housing for to and fro movement, pawl means carried by said feed bar and positioned to engage perforations in the film to feed the same, and film-presser means supported at the opposite face of said feeding film from said pawl means.

6. In and constituting members of a complete photo-recording camera, readily carried and manually manipulated by the operator for photographing records and the like, about which the protruding rim of the camera casing encircling the lens and shutter, may be placed to make the exposure, and which complete camera includes a flat camera casing body of approximately elliptical disk-like form to receive flatwise the cylindrical take-off magazine, and the cylindrical take-up magazine for the film, and a casing cover overlying said magazines; a mechanism housing constituting an integral part of the said casing body and itself having a bottom wall from which the said encircling rim projects so as to provide a free edge to be placed about the object to be photographed, a plate secured with said rim in parallelism with said bottom wall and spaced therefrom, and which plate is adapted to carry a lens and shutter, and manually-operable film-supporting and manipulating means including film feeding means between the said bottom wall and said plate, and also including a film-feed bar mounted within said mechanism-housing for to and fro movement, pawl means carried by said feed bar and positioned to engage perforations in the film to feed the same, film-presser means supported at the opposite face of said feeding film from said pawl means, and means for yieldingly forcing said presser means against the face of the film.

7. In and constituting members of a complete photo-recording camera, readily carried and manually manipulated by the operator for photographing records and the like, about which the protruding rim of the camera casing encircling the lens and shutter, may be placed to make the exposure, and which complete camera includes a flat camera casing body of approximately elliptical disk-like form to receive flatwise the cylindrical take-off magazine, and the cylindrical take-up magazine for the film, and a casing cover overlying said magazines; a mechanism housing constituting an integral part of the said casing body and itself having a bottom wall from which the said encircling rim projects so as to provide a free edge to be placed about the object to be photographed, a plate secured with said rim in parallelism with said bottom wall and spaced therefrom, and which plate is adapted to carry a lens and shutter, and manually-operable film-supporting and manipulating means including film feeding means between the said bottom wall and said plate, said casing body having two pin-like formations laterally extending inward therefrom for supporting respectively said two cylindrical magazines; said structure also having means to engage the outer faces of said two magazines to retain them in position in said body portion; said magazines each having a film spool carrier to engage a film spool.

8. A combination according to claim 7, but in which each of the said film spool carriers has a polygonally shaped base to engage a correspondingly shaped opening in the film spool.

9. A combination according to claim 7, but in which the film spool carriers 79 are provided with collars 82 for aligning the positioned film spools.

10. A combination according to claim 7, but in which the film spool carriers 79 are provided with collars 82, and with adjacent reduced diameter portions 83, washers 84 received on said reduced diameter portions, the carrier 79 for the take-up magazine also having a ratchet plate.

11. A combination according to claim 7, but in which the film spool carriers 79 are provided with collars 82, and with adjacent reduced diameter portions 83, washers 84 received on said reduced diameter portions, the carrier 79 for the take-up magazine also having a ratchet plate, and spring and washer means on said carrier 79 outside of said ratchet plate.

12. A combination according to claim 7, but in which the said body portion has secured thereto a presser plate bar between said two magazines.

13. A combination according to claim 7, but in which the said body portion has secured thereto a presser plate bar between said two magazines, and has means for adjusting the position of said presser plate bar toward and from the face of the feeding film.

14. A combination according to claim 7, but in which each of said magazines is made up of two sets of concentric cups and a cylindrical wall or body received between and engaging them.

15. A combination according to claim 7, but in which the said body portion has secured thereto a presser plate bar between said two magazines, and a spring to press said presser plate bar against the feeding film.

16. A combination according to claim 7, but in which the said body portion has secured thereto a presser plate bar between said two magazines, and a presser shoe is secured to the presser plate bar.

17. A combination according to claim 7, but in which the said body portion has secured thereto a presser plate bar between said two magazines, and a presser shoe is secured to the presser plate bar, and a resilient member of rubber-like composition is positioned between said presser shoe and the said presser bar, thereby permitting said shoe to seek a proper position against the feeding film.

EDSON S. HINELINE.